United States Patent [19]
Fisher et al.

[11] Patent Number: 6,061,653
[45] Date of Patent: May 9, 2000

[54] SPEECH RECOGNITION SYSTEM USING SHARED SPEECH MODELS FOR MULTIPLE RECOGNITION PROCESSES

[75] Inventors: Thomas D. Fisher, Plano; Dearborn R. Mowry, Irving; Jeffrey J. Spiess, Lewisville, all of Tex.

[73] Assignee: Alcatel USA Sourcing, L.P., Plano, Tex.

[21] Appl. No.: 09/115,782

[22] Filed: Jul. 14, 1998

[51] Int. Cl.[7] .................................................. G10L 15/14
[52] U.S. Cl. ....................................... 704/256; 379/88.01
[58] Field of Search ................................... 704/256, 251, 704/252, 254, 255, 243, 244; 379/88.01–88.04

[56] References Cited

U.S. PATENT DOCUMENTS

| | | | |
|---|---|---|---|
| 5,165,095 | 11/1992 | Borcherding | 379/88.03 |
| 5,644,680 | 7/1997 | Bielby et al. | 704/240 |
| 5,719,921 | 2/1998 | Vysotsky et al. | 379/88.01 |
| 5,732,187 | 3/1998 | Scruggs et al. | 704/251 |
| 5,787,396 | 7/1998 | Komori et al. | 704/256 |
| 6,006,186 | 12/1999 | Chen et al. | 704/254 |

*Primary Examiner*—David R. Hudspeth
*Assistant Examiner*—Donald L. Storm
*Attorney, Agent, or Firm*—Anderson, Levine & Lintel, LLP

[57] ABSTRACT

A method of operating a speech recognition system. The method loads a speech model from a storage facility into a memory accessible by a processor. This loading step includes two steps. A first of these steps loads process-independent state data representative of a plurality of states of the speech model. A second of these steps loads process-specific state data representative of the plurality of states of the speech model. The speech recognition system then performs a first speech recognition process with the processor by accessing the process-independent state data and a first portion of the process-specific state data. The speech recognition system also performs a second speech recognition process with the processor, where the second process also accesses the process-independent state data but further accesses a second portion of the process-specific state data different than the first portion of the process-specific state data. The speech model data may be the states, transitions, and scores of a Hidden Markov Model or pointers to the model may be loaded. In response to a third recognition process, loading a third portion of process-specific data invalidates the first portion.

22 Claims, 4 Drawing Sheets

SPEECH RECOGNITION SYSTEM USING SHARED SPEECH MODELS FOR MULTIPLE RECOGNITION PROCESSES

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to speech recognition, and are more particularly directed to a system using shared speech models to improve efficiencies over prior speech recognition systems.

Over the past decade, speech recognition in computers has dramatically improved. This improvement has led to various applications of speech recognition, such as in telephony operations. Voice activated dialing (VAD) is an example of speech recognition in telephony operations. In VAD, a computer maintains a directory which includes numbers frequently called by a caller, and for each such number the directory further includes one or more representations of a caller's voice speaking a name corresponding to the telephone number. A caller may then call a number identified in the directory by merely speaking the corresponding identifier or name into the phone, assuming that the spoken utterance matches an entry in the directory. For example, a call can be placed by saying "call the boss" or some other utterance into the phone microphone, in response to which the phone system will dial the corresponding number for the uttered name. As another example, the caller may invoke some type of telephony operation by speaking words which specify that operation, such as by stating "call waiting" or "call forwarding." Numerous other examples of speech recognition, both within and outside of telephony, will be appreciated by one skilled in the art.

Considerations in the design and implementation of speech recognition often depend on the type of speech modeling at issue. Two types of speech modeling are speaker dependent modeling and speaker independent modeling. Speaker dependent modeling is based on a fixed vocabulary from a single speaker and includes templates based on what the system expects to receive as voice signals. Additionally, speaker dependent recognition is not designed to provide secure access like speaker verification, and generally allows 50% or higher impostor acceptance. An example of such speaker dependent modeling in connection with VAD may be found in U.S. patent application Ser. No. 60/064,204 (Attorney docket number DSCC.615-00), entitled "System For Enhanced Spoken Name Dialing," filed Nov. 4, 1997, having the same inventors as the present document, and which is hereby incorporated herein by reference. In contrast, speaker independent modeling is not tightly constrained to a single speaker, and operates to identify a speech pattern, independent of the speaker, based on modeling which typically is derived from hundreds if not thousands of speech samples. This approach, therefore, necessarily gives rise to an amount of modeling data which is relatively large as compared to that of speaker dependent modeling.

By way of further background to the present embodiments, for either speaker dependent or speaker independent modeling there must be considerations of efficiency in implementing the overall system which operates per the modeling. Specifically, the type of model chosen or implemented provides a corresponding burden on items such as storage (e.g., memory size) and processing capability (e.g., speed or number of processors). Under the current state of the art for speaker dependent analyses, a typical single digital signal processor ("DSP") has been found to accomplish a relatively small number (e.g., one or two) of speaker dependent processes at a time. Such a "process" is generally a task to review one utterance during a period of time and analyze it according to the appropriate speaker dependent (and possibly other) model(s). Additionally, implementing a speaker independent process as opposed to a speaker dependent process increases the model size complexity, where the increase may be at least an order of magnitude in the case of phonetic speaker independent models. Thus, this increase if not adequately and efficiently considered may pose a strict or severe limitation on overall system operation.

Given the above, one skilled in the art will appreciate that there arises a need to provide a system for adequately and efficiently implementing speech recognition while considering the demands imposed by a particular modeling technique. One approach in view of the above-described considerations of phonetic speaker independent modeling may be to increase memory size. However, such an approach necessarily increases overall cost and, therefore, may not be acceptable given other considerations. Instead, the preferred embodiment described below sets forth an alternative approach which avoids such a corresponding cost increase and therefore improves the options available in contrast to the current state of the art.

BRIEF SUMMARY OF THE INVENTION

In one embodiment, there is a method of operating a speech recognition system. The method loads a speech model from a storage facility into a memory accessible by a processor. This loading step includes two steps. A first of these steps loads process-independent state data representative of a plurality of states of the speech model. A second of these steps loads process-specific state data representative of the plurality of states of the speech model. The speech recognition system then performs a first speech recognition process with the processor by accessing the process-independent state data and a first portion of the process-specific state data. The speech recognition system also performs a second speech recognition process with the processor, where the second process also accesses the process-independent state data but further accesses a second portion of the process-specific state data different than the first portion of the process-specific state data. Other circuits, systems, and methods are also disclosed and claimed.

DETAILED DESCRIPTION OF THE INVENTION

Figure 1:
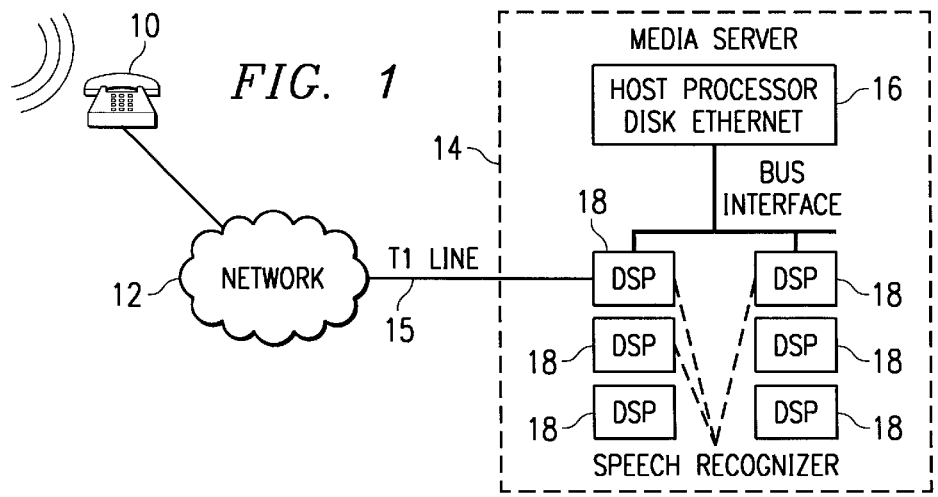
FIG. 1 illustrates a block diagram of a voice utterance and speech recognition system.

FIG. 1 illustrates a block diagram of a voice recognition system for voice utterance analyses in a telephony environment. A telephone 10 is coupled to a telecommunications network 12. Telecommunications network 12 is coupled to a media server 14 via a digital carrier 15, such as a T1 line. Media server 14 may be a general purpose workstation and has a bus interface which permits its processing circuitry 16 (including one or more processors, hard drives and communications interfaces) to communicate with a plurality of DSPs (digital signal processors) 18.

As a matter of introduction to the operation in the preferred embodiment, the voice recognition system works as follows. Initially, a control operation occurs to indicate that a caller is attempting to commence a voice activated dialing (VAD) procedure, where it is assumed that the caller has earlier enrolled in the system. For example, such a control may occur when the caller dials a particular telephone number, or merely in response to an off-hook condition at telephone 10. Of course, where the present embodiments are implemented in a non-telephony context, a different procedure may commence the relevant operations. Returning to the present example, at this point and preferably in response to a first prompt, the caller speaks an utterance, such as the name of the person to be called or a telephony control operation (e.g., "call forwarding"). The utterance is transmitted to telecommunications network 12 where the signal is digitized and multiplexed onto digital carrier 15. Given the preceding, media server 14 receives the voice signals from the caller as digitized audio data over digital carrier 15. In response to this receipt, media server 16 analyzes the data corresponding to the utterance and responds appropriately, such as by dialing the telephone number of the person whose name is represented by the utterance.

Figure 2:
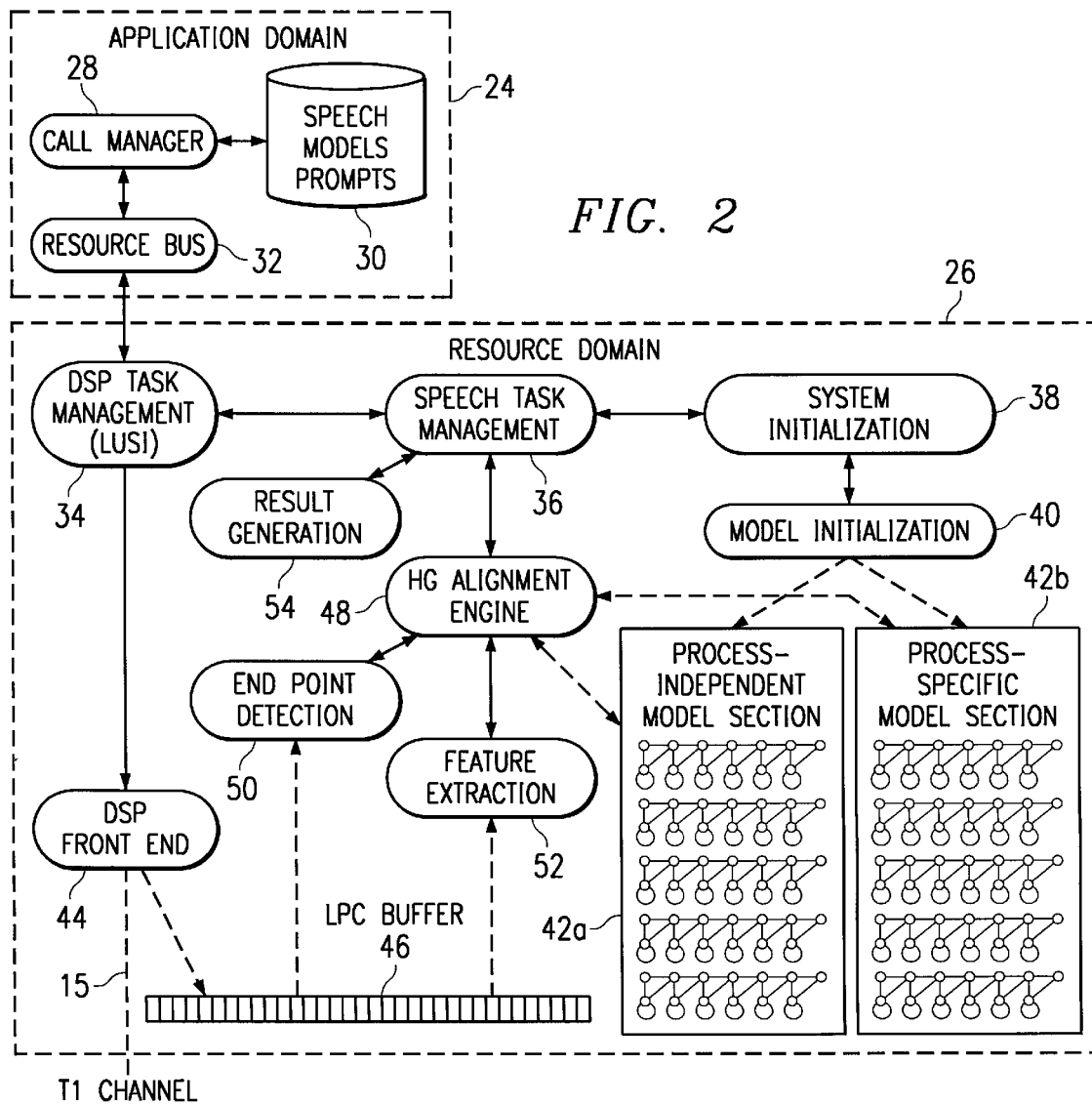
FIG. 2 illustrates a functional block diagram of the operation of media server 14 of FIG. 1 at the host level.

FIG. 2 illustrates a functional block diagram of the operation of media server 14 at the host level. For illustration purposes, the functions of the media server 14 are separated into an application domain 24 and a resource domain 26. In application domain 24, a call manager application 28 is the host level application that accesses various information from a database 30, where such information may include prompts and speaker models (i.e., either or both of independent or dependent models). This information from database 30 is downloaded via a resource bus 32 for use by DSPs 18. The prompts are downloaded to DSPs 18 and are digital voice data used to communicate with the caller. Importantly and as detailed later, the models are downloaded to a local DSP-accessible memory, such as the DSP's internal memory or an external memory accessible by the DSP, where in any event the preferred methodology increases efficiency over the prior art. The use of a particular model generally depends on whether the model is dependent or independent. A speaker dependent model, for example, may perform various functions such as representing acoustical data from a specific speaker. A speaker independent model, for example, may perform various functions such as representing phonetics for use in analyzing the caller's utterance of a person's name. As another example of speaker independent model use, in U.S. patent application Ser. No. 09/018,433 (Attorney docket number DSCC.616-00), entitled "A System For Permitting Access To A Common Resource in Response To Identification and Verification," filed Feb. 4, 1998, and hereby incorporated herein by reference, these models identify the information represented by a first utterance spoken by a caller, where that first utterance is an account number spoken by the caller (e.g., "1, 2, 3, 4, 5"). In this case, the speaker independent model is constrained by a digit grammar.

In resource domain 26, a DSP task management function 34 notifies a speech task management function 36 about an impending recognition session. Speech task management function 36 performs system initialization 38 (such as initializing counters and parameters and initializing the DSP) and then proceeds to perform model initialization 40. By way of background to model initialization 40 and as detailed later, models (either dependent or independent) in the preferred embodiment are further broken down in a manner greatly contrasting to the prior art. Specifically, in the prior art, each speech process generally has its own corresponding set of models which are independently initialized and downloaded to serve a single corresponding process. However, in the preferred embodiment, an improved system is created whereby the data of models is separated into what is referred to in this document as process-independent model data and process-specific model data, where the scope of those two data types is more readily apparent from the remaining discussion. In this regard, note that resource domain 26 includes separate storage areas 42a and 42b corresponding to these different types of model data, that is, area 42a stores process-independent model data and area 42b stores process-specific model data. Areas 42a and 42b are not necessarily different physical devices, but instead are shown as two areas to logically illustrate the separation of the two different types of model data (i.e., process-specific and process-independent). Given this background to both process-specific and process-independent model data and returning now to model initialization 40, such initialization sets up pointers within the top-level process-specific data and further links that data to the appropriate process-independent data. These steps will be further appreciated from a later discussion of the preferred data structure for both the process-specific and process-independent data.

After model initialization, DSP task management function 34 engages a DSP front end 44 to begin processing the data from digital carrier 15. DSP front end 44 converts the digitized audio data from digital carrier 15 into LPC (linear predictive code) vectors and places the LPC vectors into an LPC buffer 46. An alignment engine 48 (e.g., Hierarchical Grammar alignment) begins concurrent processing of the LPC vectors from LPC buffer 46 and continues until an end point detection function 50 determines that the utterance is complete. In this regard, alignment engine 48 is the core of the recognition process and is the component that matches the LPC-based feature vectors to the model data in storage areas 42a and 42b. Alignment engine 48 is also responsive to a feature extraction process 52 which converts the LPC vectors into Generalized Speech Features ("GSF"), which are LPC-based feature vectors. The feature vectors are designed such that each feature is statistically orthogonal to the other features. This is accomplished using a transformation matrix that has been trained from a large set of speech data. In any event, when the alignment is complete, the recognition result generation 54 notifies speech task management function 36 which in turn notifies call manager 28. At this point, therefore, call manager 28 may determine and instigate the next step of processing.

Figures 3, 4:
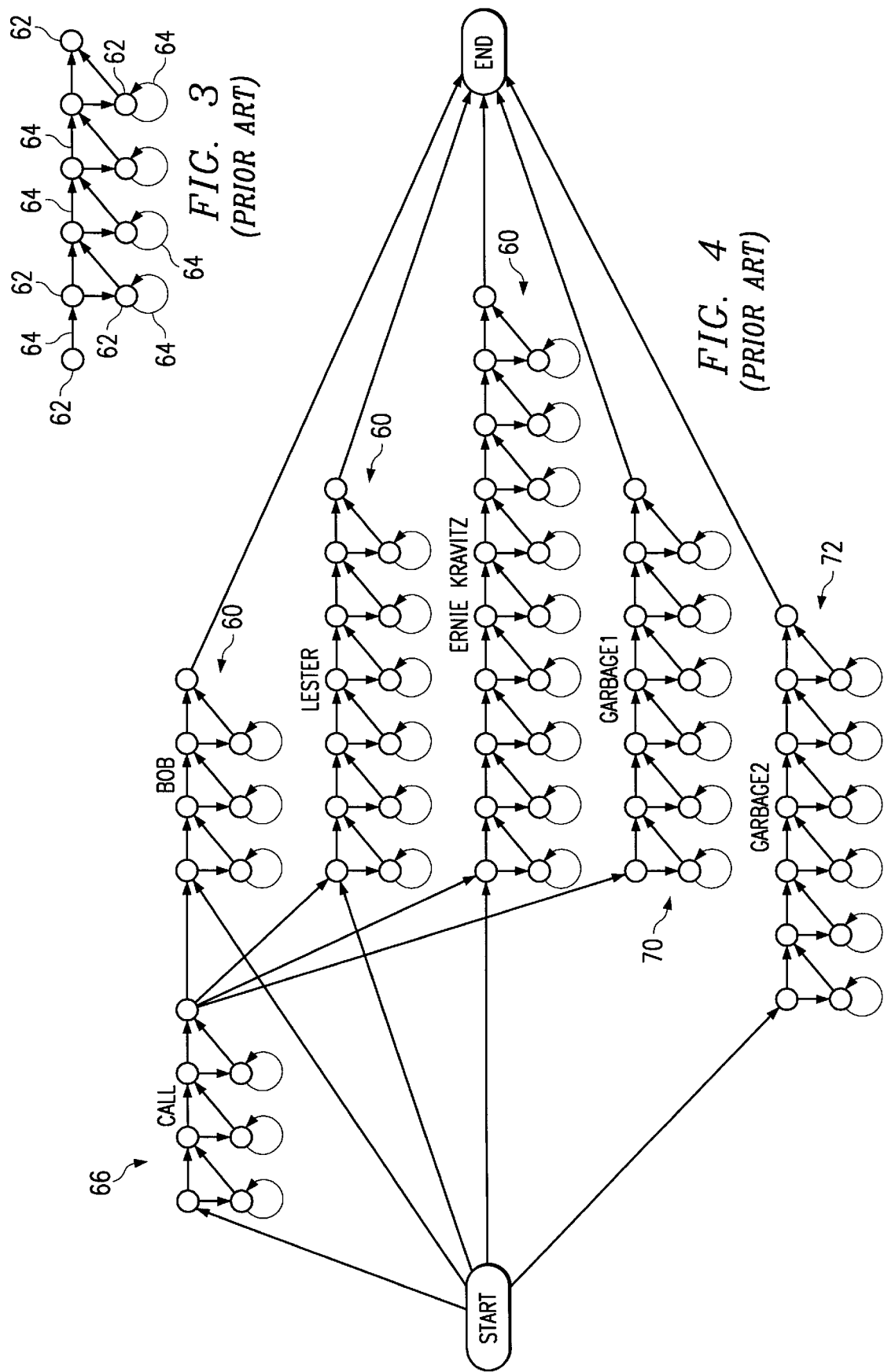
FIG. 3 illustrates an example of a standard speech model, namely, a Hidden Markov Model (HMM)
FIG. 4 illustrates an application model for voice activated dialing.

FIG. 3 illustrates an example of a standard speech model, namely, a Hidden Markov Model (HMM) 60. In the present example, HMM 60 is an FSA1 ("Finite State Automata") model. Such standard models have been used in the prior art for name or other recognition. Much is known in the art with respect to HMMs, so the present discussion is simplified to an overview to facilitate an understanding of the preferred embodiment. In particular, HMM 60 includes various states represented diagrammatically by circles 62 (only some of which are labeled as "62" in FIG. 3 to simplify the drawing). Each state represents a time period in the speech, whether in actual speech or in modeled speech. In addition, HMM 60 further includes various transition probabilities 64 represented diagrammatically by arrows either returning from one state back to that state or directing flow from a given state to a next state (also labeled in only some locations as "64" to simplify the drawing). Thus, transition probabilities 64 represent an analytical flow between a time period of speech (i.e., a state) and either the continuation of that time period through a return to that state or the ending of that time period and the beginning of a next time period by a flow to a subsequent state.

During recognition, the features derived from the digital audio data from the digital carrier are evaluated with respect to HMM 60. More specifically, for a speaker dependent model, the features derived from the digital audio data from the digital carrier are evaluated with respect to the features associated with states 62. The evaluation at a state provides a score based on two factors: (1) how closely the respective feature vectors are aligned and (2) the probability of the transition to that state. Alignment of two vectors (x1,y1,z1) and (x2,y2,z2) can be calculated as the Euclidean distance. In addition to speaker dependent models, media server 14 uses speaker independent models as well to recognize command phrases such as "call" or "directory." In the preferred embodiment, the speaker independent models could be FSA2 models or FSA1 models. FSA2 models are similar to FSA1 models, except the features are associated with the transitions instead of the states. Speaker independent models are trained with data over a class of speakers. Accordingly, unlike the speaker dependent models, the transition probabilities are not standard but are generated during the training process. In addition, the Viterbi algorithm is typically used during the ongoing recognition to calculate the maximum likelihood path through the HMM. This requires each state in the model to contain transitions back through the model recording the maximum likelihood path at each point in the evaluation. Probability scores for each path considered at each evaluation level also are tracked.

For purposes of the discussion below concerning the preferred embodiment, note that HMM 60 is necessarily represented in the system of FIG. 2 in a computer-readable form. More particularly, this form includes three separate data structures (e.g., numeric arrays). These structures consist of model data structure, state data structure, and transition data structure. The model data structure includes information which applies to the entire model. The state data structure includes information which applies to each separate state of the model. The transition data structure includes information which applies to each separate transition of the model. The format of these three structures, as well as the methodologies for accessing and storing them, are important aspects of the preferred embodiment as will be appreciated later following a more general example of the speech recognition process.

To demonstrate some of the preceding principles in general, FIG. 4 illustrates an application model for VAD which includes both a speaker independent model 66 ("call"), several speaker dependent models 68 ("Bob", "Lester", "Ernie Kravitz") and two "garbage" models 70 and 72 ("garbage1" and "garbage2", respectively). The garbage models are used to detect out of vocabulary speech, and are designed to have a higher evaluation score than the enrolled names for a spoken name which has not been enrolled. The garbage models are trained as speaker independent models.

In operation, DSPs 18 evaluate the incoming audio data to find the best match with the models. In the example, shown in FIG. 4, the DSP evaluates eight possibilities: (1) "call Bob", (2) "call Lester", (3) "call Ernie Kravitz", (4) "call <garbage1>", (5) "Bob", (6) "Lester", (7) "Ernie Kravitz", (8) "<garbage2>". The recognition algorithm assigns a score to each of the possibilities, and the highest score is considered to be the closest match. In this example, if "call <garbage1>" or "<garbage2>" receives the highest score, an out of vocabulary rejection results.

Turning the discussion now to the preferred methodology relating to the model data structures of the preferred embodiment, it is first instructive to note what the inventors have observed in connection with the present embodiments insofar as prior art data structures are concerned. In this regard, the present inventors have recognized that the data which is recorded during recognition typically grows considerably in size. Moreover, the prior art method of storing and accessing such data is inefficient when it is desirable to perform multiple simultaneous recognition processes. In other words, in the prior art each recognition process relies on its own corresponding model(s). Given this limitation, a corresponding limitation has been that typically a single processor, such as a DSP, may perform only one recognition process at a time. As DSPs became more powerful, this limitation was increased to permit a single DSP to perform two processes at a time by effectively switching back and forth between processes until each was complete. However, it has been recognized in connection with the present embodiments that even under this "advanced" operation, each of the two processes had its own corresponding and independent set of speech models. It has been further recognized, therefore, that such an approach results in duplication of data and wasted space in memory. This inefficiency is further exacerbated in that speech models themselves have grown dramatically over time. For example, phonetic and sub-word modeling techniques often require 10 to 100 times the storage as compared to small grammars comprised of word models.

Given the above, the preferred embodiments improve upon the efficiency of the processing speech models by separating portions of those models into process-independent storage area 42*a* and process-specific storage area 42*b*. In this manner and as shown below, data in process-independent storage area 42*a* may be shared by more than one speech recognition process and, as such, it need not be duplicated for different processes and therefore the amount of overall memory space is reduced. Additionally, because this data may be shared by certain processes, it is possible that such data can be loaded during initialization and then not re-loaded each time a new process which may share that data is performed. These aspects will be further appreciated below, as is demonstrated first by way of an example using both process-independent and process-specific data followed by an illustration of the preferred format for storing both types of such data.

Figure 5:
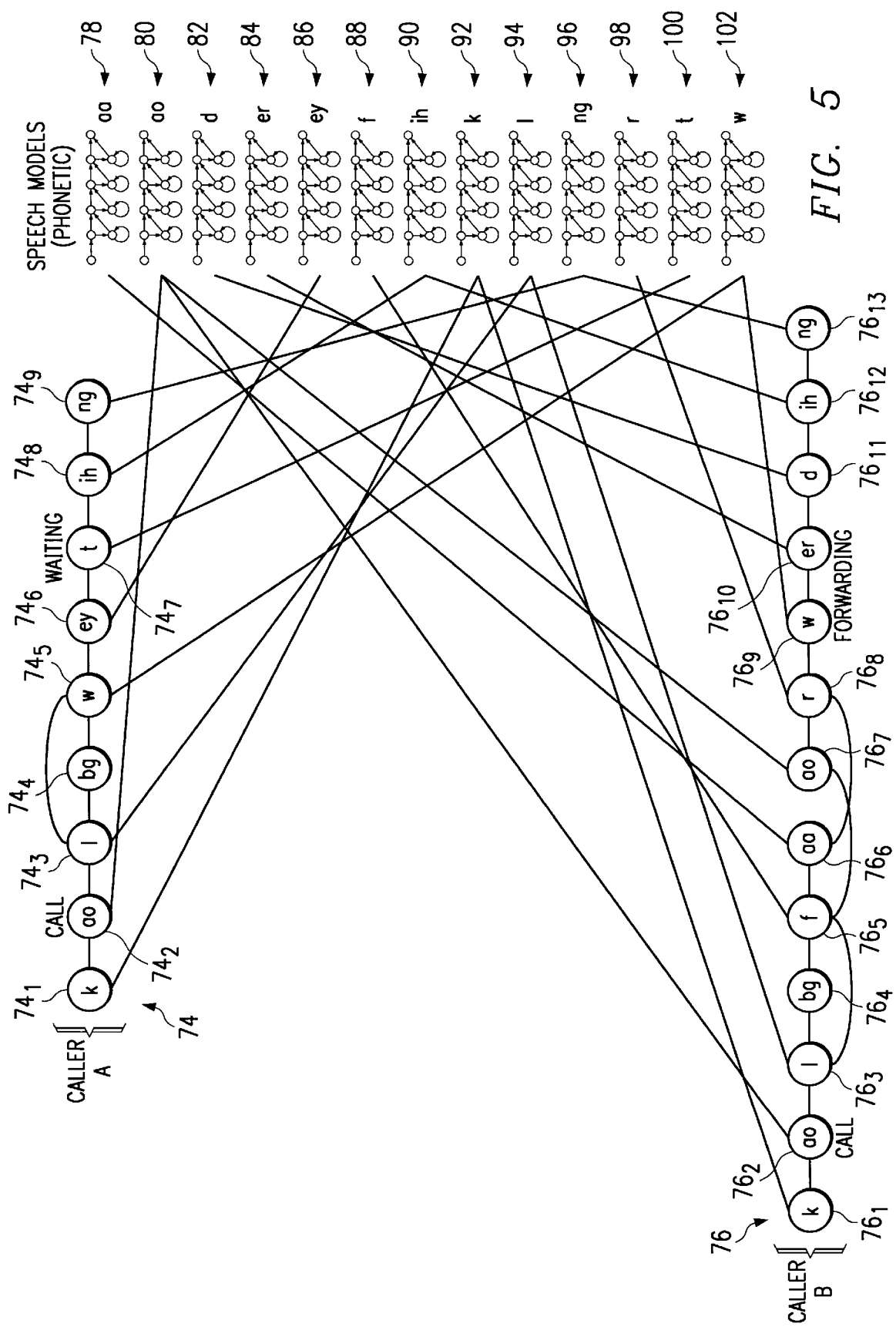
FIG. 5 illustrates an example of how process-specific and process-independent data may be used according to the preferred embodiment to recognize speech in a telephony context.

FIG. 5 illustrates an example of how process-specific and process-independent data may be used according to the preferred embodiment to recognize speech in a telephony context. More specifically, FIG. 5 illustrates an example of how process-specific speech models may be linked to process-independent speech models. In particular, FIG. 5 illustrates a first process-specific speech model 74 which is used to perform a first speech recognition process for a phrase spoken by a first caller, referred to herein for purposes of convenience as caller A. Similarly, FIG. 5 illustrates a second process-specific speech model 76 which is used to perform a second speech recognition process for a phrase spoken by a second caller, referred to herein for purposes of convenience as caller B. In the current example, both callers A and B are uttering typical control phrases in the telephony context, with caller A uttering "call waiting" and caller B uttering "call forwarding." Each process-independent model 74 and 76 has a series of states representing periods of time corresponding to the received utterance. For example, process-independent model 74 commences with a state $74_1$ and includes a total of nine states thereby concluding with state $74_9$. Similarly, process-independent model 76 includes thirteen states designated $76_1$ through $76_{13}$. For both models, they include states designated as "bg" (i.e., states $74_4$ and $76_4$) for periods of anticipated silence which separate the two words of each utterance. FIG. 5 further illustrates a number of process-independent models 78 through 102. In the present example, each of models 78 through 102 is a phonetic speech model which is accessible by one or more speech recognition processes by linking the model to one or more process-independent models. For example in FIG. 5, the beginning consonant sound (i.e., "k") for the utterance by both callers A and B is linked to process-independent speech model 92 as shown by a line from both states $74_1$ and $76_1$ to model 92. This same convention is used for the remainder of the Figure and, therefore, one skilled in the art will appreciate the other links between states of each process-specific model and corresponding process-independent models.

Given the illustration of FIG. 5, the following observations may be made about the preferred embodiment. By linking between process-independent and process-specific models, the two speech recognition processes (i.e., one for caller A, one for caller B) may both share and access at least a portion of the same data representing process-independent speech model 92. This sharing aspect also applies to the other process-independent models, which in the example of FIG. 5 is illustrated for process-independent models 80, 90, 92, 94, 96, and 102. Accordingly, this shared data is not duplicated in local memory as in the prior art which would store such information in two different areas of such memory, once for the speech recognition process for caller A and a once for the speech recognition process for caller B. Moreover, while the present illustration is only for two concurrent speech processes, the same inventive principle may be extended to more than two processes as well. In addition, in the preferred embodiment each of models 78 through 102, as process-independent models, is preferably loaded from hard storage into the memory associated with a DSP 18 either at boot time or some other infrequent interval. Conversely, each process-specific model is loaded (and initialized) at a more frequent interval, namely, when needed to perform the given recognition process (e.g., when either caller A or caller B is using the system). As such, after boot up much of the model data (i.e., process-independent) needed for the speech recognition processes remains resident or static in the system for most if not all of its operation, whereas the lesser amount of process-specific model data is transient in that it is required to be dynamically downloaded for a given process and then invalidated when different process-specific model data is downloaded for a newer speech recognition process. In this regard, the term invalidation is intended to mean that one set of process-specific data becomes unavailable for use by a process when a newer process requires service and its own process-specific data is loaded in favor of the previous process-specific data existing for the previous process. Thus, the actual invalidation may occur by overwriting the area in memory which stored the previous process-specific data with the process-specific data for the newer process. Alternatively, when the newer process-specific data is downloaded, a flag or other like indicator may be set or action taken so that the older process-specific data, while possibly still in local memory in part or whole, is no longer accessible by the prior process. In any event and returning to the overall contrast between process-independent data and process-specific data, in most cases the majority of the structure and acoustic information contained in the speech models will reside in the shared process-independent models and remain resident in local memory. Preferably, the process-specific data will only correspond to some top-level information, such as high level grammar and will be small in comparison to the amount of information for the lower level analyses such as phonetic models, where that lower level data is preferably represented as process-independent data. Accordingly, the burden on other system resources such as input/output and initialization times are also reduced by the sharing of data in the manner illustrated in FIG. 5.

Figure 6:
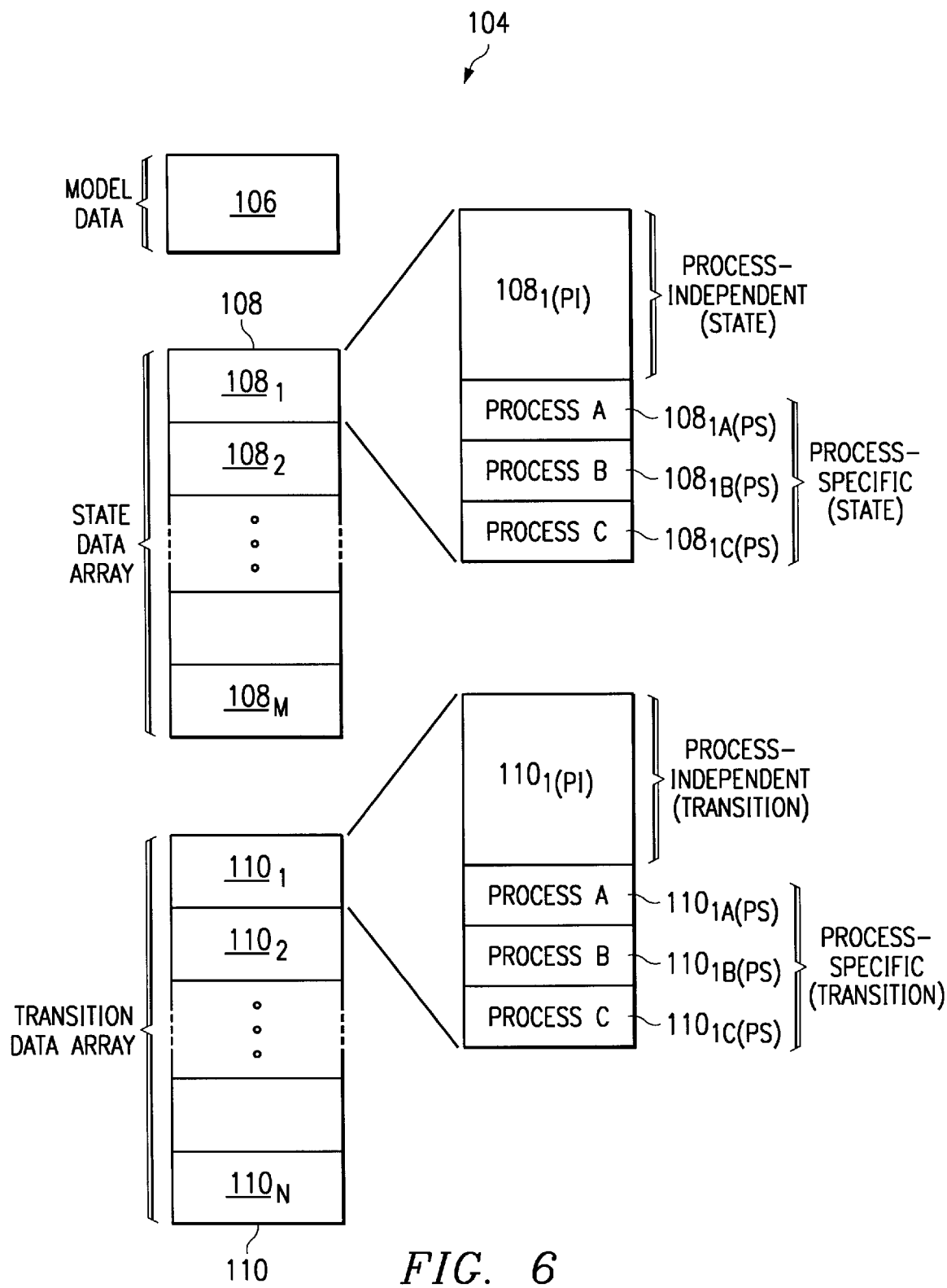
FIG. 6 illustrates the preferred data structure for a speech model in accordance with the preferred embodiment.

FIG. 6 illustrates the preferred data structure 104 for the data representing a speech model in accordance with the principles described above. At the outset, recall it was earlier introduced that model data includes three separate numeric array data structures, consisting of a model data structure, state data structure, and transition data structure. In this regard, data structure 104 includes a model data structure 106, a state data structure array 108, and a transition data structure array 110. As in the case of the prior art, model data structure 106 includes information which applies to the entire model. For example, such information may include the total size of the model (e.g., in words), an identifier for the model, and the number of states in the model. Also as in the prior art, each of arrays 108 and 110 include multiple entries, where that variable number is shown in FIG. 6 as M for array 108 and N for array 110. For example, state data structure array 108 includes entries $108_1$ through $108_M$. In contrast to the prior art, however, each of these entries is further separated into two portions, those being a process-independent portion and a process-specific portion, each of which is discussed below.

As shown in an expanded view in FIG. 6, state data structure $108_1$ includes a process-independent state portion $108_{1(PI)}$. Since this data is designated process-independent, then it is accessible (e.g., for reading or writing) by any of the processes having access to data structure 104. Such process-independent data may be of various types. For example, a pointer to the host model is one type of data which may be designated as process-independent. As another example, the number of transitions for a given state may be designated as process-independent. As yet another example, the state stop score may be designated as process-independent. More specifically, a score is a numeric metric of how closely aligned a given path through the model is with the incoming speech data for the speaker. This is computed during the alignment process (see alignment engine 48 of FIG. 2) for each model path being evaluated. A stop score is used to allow the recognition to terminate, selecting the current best path through the model. Still other examples will be ascertainable by one skilled in the art.

As also shown in an expanded view in FIG. 6, state data structure $108_1$ includes a process-specific data portion $108_{1(PS)}$. Process-specific data portion $108_{1(PS)}$ is further separated into different areas, where each area may be accessed (e.g., for reading or writing) only by the process for which it is specific. To further illustrate this implementation and access of process-specific data, in FIG. 6 it is assumed by way of example that three processes have access to data structure 104 in general, those processes shown as Process A, Process B, and Process C. Such processes, by further example, could correspond to speech recognition of three different callers A, B, and C, respectively. Given the access to structure 104 and the further division of process-specific data $108_{1(PS)}$, process A may only access process-specific state data $108_{1A(PS)}$, process B may only access process-specific state data $108_{1B(PS)}$, and process C may only access process-specific state data $108_{1C(PS)}$. Moreover, should another process D next require service, then its process-specific data will be downloaded from storage thereby invalidating (e.g., possibly physically overwriting) the data in one of data areas $108_{1A(PS)}$, $108_{1B(PS)}$, or $108_{1C(PS)}$. In this regard, therefore, the process-specific data is transient in nature as compared to the more resident nature of the process-independent data which generally is loaded during initialization and typically not changed thereafter. Further in this regard, when the new process-specific data is downloaded (e.g., for process D), the process-independent data $108_{1(PI)}$ is unaffected, and therefore only a relatively small data change is required in contrast to having to move an entire new model (i.e., with all of model data, state data, and transition data) into memory from some other storage. Concluding this discussion of process-specific data, note that such data may be of various types. For example, for a given process, either the active score or a pointer to the active score is one type of data which may be designated as process-specific. In this regard, note that the active score is the score for the best path through the model terminating with the current state. As another example, the cumulative number of occurrences of this state, for a given process, may be designated as process specific. Still other examples will be ascertainable by one skilled in the art.

Lastly, one skilled in the art should appreciate that the preceding discussion pertaining to state data structure 108 applies in comparable fashion to transition data structure 110. Thus, without stating the preceding again in full detail, the modeling information as it relates to transitions, as opposed to states, is also separated into a process-independent transition area $110_{1(PI)}$, and process-specific transition areas $110_{1A(PS)}$, $110_{1B(PS)}$, and $110_{1C(PS)}$. Here, process-independent transition area $110_{1(PI)}$ may store transition data such as a pointer to the destination state, a transition score, or a pointer to the observation model. The process-specific transition data may include, for a given process, either the active score or a pointer to the active score. In any event, the separation of transition data in this resident versus transient manner also reduces overall burden by having a majority of the data immediately accessible to a process with a lesser portion of the data dynamically changed to accommodate a change to another speech recognition process.

Given the above, one skilled in the art should appreciate various aspects and benefits of the preferred embodiment. For example, the preferred embodiment provides a manner of speech recognition whereby speech models are separated into resident and transient data, thereby reducing the frequency of transfers for large data blocks and also reducing an otherwise large requirement for local memory storage. Indeed, from this there is a reduction in the burdens and drawbacks which are required in various prior art approaches for speech recognition. As another example, because the preferred embodiment improves speech modeling, it necessarily improves the entire system which implements the speech recognition process. As yet another benefit of the preferred embodiment, note that various substitutions, modifications or alterations could be made to the descriptions set forth above. For example, the preceding principles may apply to speaker independent as well as speaker dependent models. Additionally, the separation of model data into resident and transient portions may be used for either or both of state and transition model data. As yet another example, while the preferred embodiment relates to the field of telephony, still other speech recognition systems may well implement the present inventive scope. As still another example, while FIG. 1 illustrates one system operable to implement the principles of FIGS. 2, 5, and 6, other systems also may be derived. Still other examples will be ascertainable by one skilled in the art and, thus, while the preceding embodiments have been described in detail, various changes could be made to the descriptions set forth above without departing from the inventive scope which is defined by the following claims.

We claim:

1. A method of operating a speech recognition system, comprising the steps of:

loading a speech model from a storage facility into a memory accessible by a processor, comprising the steps of:

loading process-independent state data representative of a plurality of states of the speech model;

loading process-specific state data representative of the plurality of states of the speech model;

performing a first speech recognition process with the processor by accessing the process-independent state data and a first portion of the process-specific state data; and performing a second speech recognition process with the processor by accessing the process-independent state data and a second portion of the process-specific state data different than the first portion of the process-specific state data.

2. The method of claim 1:

wherein the step of loading the speech model further comprises:

loading process-independent transition data representative of a plurality of transitions of the speech model;

loading process-specific transition data representative of the plurality of transitions of the speech model;

and further comprising the steps of:

performing the first speech recognition process with the processor by accessing the process-independent transition data and a first portion of the process-specific transition data; and performing a second speech recognition process with the processor by accessing the process-independent transition data and a second portion of the process-specific transition data different than the first portion of the process-specific transition data.

3. The method of claim 2:

wherein the step of loading the speech model further comprises the step of invalidating the first portion of the process-specific transition data responsive to loading a third portion of process-specific transition data into the memory;

and further comprising the step of performing a third speech recognition process with the processor by accessing the process-independent transition data and the third portion of the process-specific transition data.

4. The method of claim 2 wherein the process-independent transition data comprises data selected from the group consisting of a pointer to a destination state, a transition score, and a pointer to an observation model.

5. The method of claim 2 wherein the process-specific transition data comprises data selected from the group consisting of an active score and a pointer to an active score.

6. The method of claim 2:
wherein the step of loading the speech model further comprises the steps of:
invalidating the first portion of the process-specific transition data responsive to loading a third portion of process-specific transition data into the memory;
invalidating the first portion of the process-specific state data responsive to loading a third portion of process-specific state data into the memory;
and further comprising the step of performing a third speech recognition process with the processor by accessing the process-independent state data and the third portion of the process-specific state data and the third portion of the process-specific transition data.

7. The method of claim 1:
wherein the step of loading the speech model further comprises the step of invalidating the first portion of the process-specific state data responsive to loading a third portion of process-specific state data into the memory;
and further comprising the step of performing a third speech recognition process with the processor by accessing the process-independent state data and the third portion of the process-specific state data.

8. The method of claim 1 wherein the step of loading a speech model comprises loading a hidden Markov model.

9. The method of claim 1 wherein the step of loading a speech model comprises loading a phonetic speech model.

10. The method of claim 1 wherein the process-independent state data comprises data selected from the group consisting of a pointer to a host model, a number of transitions for a given state, and a state stop score.

11. The method of claim 1 wherein the process-specific state data comprises data selected from the group consisting of an active score, a pointer to an active score, and a cumulative number of occurrences of a state.

12. The method of claim 1 wherein the step of loading a speech model further comprises loading model data, the model data comprising data selected from the group consisting of a total size of the speech model, an identifier for the speech model, and number of states in the speech model.

13. The method of claim 1 wherein the speech recognition system is a telephony speech recognition system.

14. A method of operating a speech recognition system, comprising the steps of:
loading a speech model from a storage facility into a memory accessible by a processor, comprising the steps of:
loading process-independent data representative of a group selected from one of a plurality of states of the speech model and a plurality of transitions of the speech model;
loading process-specific data representative of the group selected from one of a plurality of states of the speech model and a plurality of transitions of the speech model;
performing a first speech recognition process with the processor by accessing the process-independent data and a first portion of the process-specific data; and
performing a second speech recognition process with the processor by accessing the process-independent data and a second portion of the process-specific data different than the first portion of the process-specific data.

15. A speech recognition system, comprising:
a storage facility for storing a speech model;
a plurality of processors; and
a computer programmed to perform the steps of:
loading the speech model from the storage facility into a memory accessible by one of the plurality of processors, comprising the steps of:
loading process-independent data representative of a group selected from one of a plurality of states of the speech model and a plurality of transitions of the speech model;
loading process-specific data representative of the group selected from one of a plurality of states of the speech model and a plurality of transitions of the speech model;
wherein one of the plurality of processors is programmed to perform the steps of:
performing a first speech recognition process with the processor by accessing the process-independent data and a first portion of the process-specific data; and
performing a second speech recognition process with the processor by accessing the process-independent data and a second portion of the process-specific data different than the first portion of the process-specific data.

16. The system of claim 15 wherein the one of the plurality of processors is programmed to further perform the steps of:
invalidating the first portion of the process-specific data responsive to loading a third portion of process-specific data into the memory, the third portion representative of the group selected from one of a plurality of states of the speech model and a plurality of transitions of the speech model; and
performing a third speech recognition process with the processor by accessing the process-independent data and the third portion of the process-specific data.

17. The system of claim 15 wherein the process-independent data represents the plurality of transitions of the speech model and comprises data selected from the group consisting of a pointer to a destination state, a transition score, and a pointer to an observation model.

18. The system of claim 15 wherein the process-specific data represents the plurality of transitions of the speech model and comprises data selected from the group consisting of an active score and a pointer to an active score.

19. The system of claim 15 wherein the process-independent data represents the plurality of states of the speech model and comprises data selected from the group consisting of a pointer to a host model, a number of transitions for a given state, and a state stop score.

20. The system of claim 15 wherein the process-specific data represents the plurality of states of the speech model and comprises data selected from the group consisting of an active score, a pointer to an active score, and a cumulative number of occurrences of a state.

21. The system of claim 15 wherein the a speech model a hidden Markov model.

22. The system of claim 15 wherein the speech model comprises a phonetic speech model.

* * * * *